(No Model.)

F. D. CADY.
ELECTRIC CONDUCTOR.

No. 304,170. Patented Aug. 26, 1884.

UNITED STATES PATENT OFFICE.

FRANCIS D. CADY, OF WATERBURY, CONNECTICUT.

ELECTRIC CONDUCTOR.

SPECIFICATION forming part of Letters Patent No. 304,170, dated August 26, 1884.

Application filed April 19, 1884. (No model.)

*To all whom it may concern:*

Be it known that I, FRANCIS D. CADY, of Waterbury, in the county of New Haven, and in the State of Connecticut, have invented certain new and useful Improvements in Electric Conductors; and I do hereby declare that the following is a full, clear, and exact description thereof, reference being had to the accompanying drawings, in which—

Figure 1:
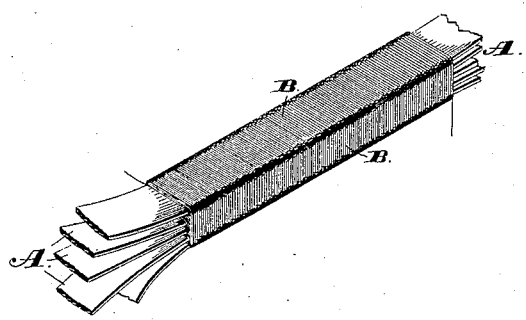
Figure 2:
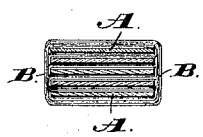

Figure 1 is an enlarged perspective view of a section of my improved conductor, and Fig. 2 is a cross-section of the same.

Letters of like name and kind refer to like parts in each of the figures.

My invention has for its object the production of an electric conductor in which are combined a minimum of weight and cost and a maximum of efficiency; to which end it consists in an electric conductor composed of strips of metal which are arranged in parallel lines, and are bound together and insulated from each other by means of suitable material that is wound around and between said parts, substantially as and for the purpose hereinafter specified.

In the construction of my conductor any desired number of metal strips A are arranged in parallel lines, and are secured together and insulated from each other by means of a suitable flexible material, B, which passes spirally between and around said parts, and forms of the whole a cable that possesses in a remarkable degree strength and lightness. Each strip A possesses a capacity for conducting electricity fully equal to that of a wire having an equal extent of surface and several times its weight, and being thoroughly insulated from each of the other strips affords a perfect medium for the transmission of an electric current.

For outdoor or underground use the conductor thus constructed is further protected by means of a coat of water-proof material; but for use in buildings such additional protection is dispensed with.

Having thus fully set forth the nature and merits of my invention, what I claim as new is—

An electric conductor composed of strips of metal arranged in parallel lines, and bound together and insulated from each other by means of non-conducting material that is wound between and around the strips, substantially as shown and described.

In testimony that I claim the foregoing I have hereunto set my hand this 28th day of March, 1884.

FRANCIS D. CADY.

Witnesses:
 JAS. E. HUTCHINSON,
 GEO. S. PRINDLE.